United States Patent [19]
Bridgeford

[11] 3,723,306
[45] Mar. 27, 1973

[54] SEPARATION OF IONS OR MOLECULES FROM MIXTURES USING GRAFT-POLYMERIZED OR POLYMER DEPOSITED ION EXCHANGE OR PERMSELECTIVE MATERIALS

[75] Inventor: Douglas J. Bridgeford, Champaign, Ill.

[73] Assignee: Tee-Pak, Inc., Chicago, Ill.

[22] Filed: Feb. 19, 1971

[21] Appl. No.: 117,155

Related U.S. Application Data

[63] Continuation of Ser. No. 789,064, Jan. 2, 1969, abandoned, which is a continuation-in-part of Ser. No. 508,597, Nov. 18, 1965, abandoned, which is a continuation-in-part of Ser. No. 413,997, Nov. 25, 1964, Pat. No. 3,227,510, which is a continuation-in-part of Ser. No. 264,781, March 13, 1963, abandoned, which is a continuation-in-part of Ser. No. 718,995, March 8, 1958, Pat. No. 3,083,118, which is a continuation-in-part of Ser. No. 594,124, June 27, 1956, abandoned, which is a continuation-in-part of Ser. No. 466,218, Nov. 1, 1954, abandoned, which is a continuation-in-part of Ser. No. 445,451, July 23, 1954, abandoned.

[52] U.S. Cl. .................210/22, 55/16, 210/23, 210/24
[51] Int. Cl. ....................B01d 31/00, B01d 13/00

[58] Field of Search....210/22, 23, 24, 321, 500, 506, 210/507, 508; 260/2.1, 2.2, 17.4; 204/180 P; 55/16

[56] References Cited

UNITED STATES PATENTS

| 2,593,540 | 4/1952 | Cornwell et al. | 204/180 P |
| 3,041,292 | 6/1962 | Hatch | 260/2.2 X |
| 2,617,443 | 11/1952 | Jones | 55/16 |
| 3,247,133 | 4/1966 | Chen | 206/2.1 |

*Primary Examiner*—Frank A. Spear, Jr.
*Attorney*—Neal J. Mosely

[57] ABSTRACT

Mixtures of materials including solutions, gaseous mixtures, and colloids are purified or separated by contact with or passing through ion exchange or permselective materials which have been modified by polymer deposition or graft polymerization. The materials used in the separatory process are generally webs, membranes, beads, granules, or other shaped objects which have ion exchange capacity or permselective surface characteristics, which materials have been modified by graft polymerization or polymer deposition to provide the desired permselective or ion exchange characteristics.

13 Claims, No Drawings

SEPARATION OF IONS OR MOLECULES FROM MIXTURES USING GRAFT-POLYMERIZED OR POLYMER DEPOSITED ION EXCHANGE OR PERMSELECTIVE MATERIALS

CROSS-REFERENCE TO RELATED APPLICATIONS

This application is a continuation of patent application, Ser. No. 789,064, filed Jan. 2, 1969, now abandoned; which is a continuation-in-part of patent application, Ser. No. 508,597, filed Nov. 18, 1965, now abandoned; Ser. No. 413,997, filed Nov. 25, 1964, now U.S. Pat. No. 3,227,510; Ser. No. 264,781, filed Mar. 13, 1963, now abandoned; Ser. No. 718,995, filed Mar. 8, 1958, now U. S. PaT. No. 3,083,118; Ser. No. 594,124, filed June 27, 1956, now abandoned; Ser. No. 466,218, filed Nov. 1, 1954, now abandoned; and Ser. No. 445,451, filed July 23, 1954, now abandoned.

BACKGROUND OF THE INVENTION

In the separation of fluid mixtures, including solutions, colloidal mixtures, and colloidal mixtures containing dissolved materials, a variety of selective separatory processes have been used. In the separation of ionizable materials from solution, one of the major processes utilized has been ion exchange. In the separation of molecules or ions of different sizes in solution of emulsion or in some cases in gas phase, various permselective processes have been utilized.

Ion exchange separatory techniques have been developed to a high degree and are now considered an engineering unit operation. Ion exchange is considered in great detail in several recent text books, e.g. *Ion Exchange*, Helfferich, 1962, McGraw Hill Book Company, Inc.

The various permselective processes are considered in detail in *Diffusion and Membrane Technology*, Tuwiner, 1962, Reinhold Publishing Corporation. Permselective processes generally involve unsupported membranes or webs but sometimes involve the use of beads or granules or other formed materials having surface layers which function as supported membranes for effecting the desired separation.

In dialysis, a membrane separates two solutions of different concentration and is impermeable to the solvent but permeable to the solute with the result that the concentration gradient dries the solute from the concentrated solution through the membrane into the less concentrated solution (or pure solvent). Dialysis is used commercially in the recovery of caustic from rayon viscose liquors and has a rapidly growing use in artificial kidney machines used in hospitals for treating victims of kidney disease.

In electrodialysis an ionic solute is driven through a membrane to an electrode by an applied electric potential. The membrane is impermeable to solutes of opposite charge. In most applications, pairs of membranes permeable to either cations or anions are used. Electodialysis is used commercially in the desalination of brackish water and in the demineralization of milk whey.

Electrodecantation is a process in which an ionic solute is caused to migrate by an applied electric potential and collects at the surface of an impermeable membrane. The resulting increase in the density of the solution layer causes a gravitational concentration of the solute and permits the separation of a fraction of higher purity. Electrodecantation is used commercially in the dewatering of rubber latex and has considerable promise due to lower capital cost.

Osmosis, as a separatory process, involves the diffusion of solvent from a more dilute solution (or pure solvent) through a semi-permeable membrane into a more concentrated solution. The driving force is the concentration differential between the solutions. Osmosis has been used in experimental processes for the concentration of fruit juices.

Reverse osmosis, also called ultrafiltration, involves the reversal of the osmosis process to purify a solvent. If sufficient pressure is applied to a concentrated solution adjacent to a semi-permeable membrane, the osmotic flow is suppressed and the solvent forced through the membrane into the more dilute solution or pure solvent. Reverse osmosis has been used in the desalination of brackish water and in the concentration of sugar solutions.

In thermo-osmosis, liquid is transported across a semi-permeable membrane which separates two identical liquids of different temperatures.

In electro-osmosis, a solvent is forced across a semi-permeable membrane by an electric potential. This process is analogous in some respects to electrodialysis and has not yet received any commercial application.

In membrane filtration, membranes with pores of defined uniform diameter are used to pass liquids and gases but retain colloidal matter and solid particles, micro-organisms, and even single cells. Selectivity in processes using membrane filtration is based on particle size and shape alone. Membrane filtration utilizes web or membranes having pore sizes ranging from 0.005 – 10 microns, which is effective in sterilization of water and beverages. Membrane filtration is used commercially in the cold sterilization of beer.

Membrane permeation, also called pervaporation, involves the separation of a component (gas or liquid) from a fluid mixture by passing through a semi-permeable membrane. By application of a pressure differential across the membrane the permeant is concentrated on the other side of the membrane. Membrane permeation has been used in the separation of helium from natural gas and in the removal of water from higher alcohols.

The various separatory processes described above, including both ion exchange processes and the various permselective processes, are subject to the disadvantage that it has generally not been possible to devise materials for use in these processes which are especially adapted for the separation of preselected materials or for use in particular systems, such as non-aqueous solutions, etc. As a result, there has been a considerable need for the preparation of ion exchange materials and permselective materials in a physical form and having physical and chemical properties suitable for separation of desired materials.

SUMMARY OF THE INVENTION

This invention is based on the discovery that substantial improvements in separation of mixtures by ion exchange or by permselective processes may be obtained by using ion exchange materials or permselective materials comprising a host material having a guest polymer of an olefinically unsaturated monomer deposited or graft polymerized therein. The polymer deposited or graft polymerized host material may be prepared in accordance with the properties desired in the separatory process. Thus, in producing an improved ion exchange process, a guest polymer is deposited or graft polymerized in a host material to produce a product having additional ion exchange capacity. This is accomplished by depositing or graft polymerizing a polymer having ion exchange functional groups or having functional groups which can be converted, e.g. by hydrolysis, to ion exchange groups. The deposition or graft polymerization of a polymer into a host material may also be utilized to vary the permselective properties of the host and produce a permselective membrane or web or other separatory body having a pre-determined selectivity for the particular materials to be separated or having preselected properties making it especially suitable for use in reactive solvents or in solvents which would attack the permselective host material.

In carrying out ion exchange or permselective separatory processes utilizing polymer deposited or graft polymerized materials it is preferred to use materials which have been produced in accordance my U.S. Pat. No. 3,083,118. While compositions prepared in accordance with that patent are preferred, for a variety of reasons, it is also possible to use ion exchange materials or permselective materials prepared by other polymer deposition and/or graft polymerization techniques.

In carrying out the improved ion exchange or permselective processes of this invention, any suitable materials may be used which have been chemically modified by deposition or grafting of a polymer therein to produce the desired ion exchange properties or permselective properties. A particular advantage in this invention resides in the preparation and use of improved ion exchange webs or membranes and improved permselective webs and membranes for use in separatory processes.

DESCRIPTION OF THE PREFERRED EMBODIMENTS

In carrying out this invention, an ion exchange material or permselective material in the form of a membrane, web, beads, particles, fibers, filaments, etc. is treated with a suitable monomer under conditions which effect a deposition and grafting of a polymer within and upon the host material. In many preferred applications, the host material is in a form of a film, such as regenerated cellulose, or a web such as paper, or in the form of particulate material such as sawdust or wood chips or particles or beads of an inorganic or organic polymer. The guest polymer is deposited and grafted within and upon the host material to provide additional ion exchange sites, in the case of ion exchange materials, and to modify the permselective properties in the case of permselective materials. The polymer deposition and graft polymerization may be carried out in accordance with any of a variety of prior art techniques although the process of U.S. Pat. No. 3,083,118 is generally preferred.

In the preparation of ion exchange materials or permselective materials for use in accordance with this invention according to the process of U.S. Pat. No. 3,083,118, a host material is selected of suitable form which has some appreciable amount of ion exchange capacity, either inherently in the material or artificially produced. The host material is treated with a catalyst component which is ionic and which is deposited in the host by ion exchange reaction. After the catalyst is deposited in the host material, the catalyst-modified host is treated with the desired monomer and any additional catalyst component which may be required, thus effecting a graft polymerization within and upon the host which is localized largely in the areas where the catalyst component was positioned by ion exchange reaction. The conditions required for carrying out this process of polymer deposition and grafting are described in considered detail in U.S. Pat. No. 3,083,118 and need not be repeated here. Generally, in preparing materials for use in the separatory processes of this invention, any guest monomer may be used which will modify the host material to produce the desired permselective properties or which will introduce the desired ion exchange groups in the case of an ion exchange material. The process of U.S. Pat. No. 3,083,118 is effective to deposit and to graft polymers within host materials of any desired form or shape and to locate the guest polymer in pre-selected regions of the host material. Thus, if desired, the guest polymer may be located uniformly throughout the host material or in selected regions of the interior or the surface of the host material.

While the process of U.S. Pat. No. 3,083,118 is preferred for use in preparation of ion exchange materials and premselective materials for the separatory processes of this invention, it is possible to use graft polymerized materials produced by other processes of graft polymerization, such as radiation grafting, ceric ion grafting, and other deposition or grafting techniques such as those discussed in *Block and Graft Polymers*, Burlant and Hoffman, Reinhold Publishing Corporation, 1960.

In carrying out the improved separatory processes of this invention, the graft polymerized materials are utilized in substantially the same manner as corresponding materials have been utilized in these separatory processes. Thus, graft polymerized ion exchange membranes are contacted with solutions from which anions or cations are to be separated and the solutions passed in contact with or through the membrane until its ion exchange capacity has been exhausted. In other separatory processes such as the various permselective processes discussed above, e.g. dialysis, electrodialysis, osmosis, reverse osmosis, thermo-osmosis, electro-osmosis, electrodecantation, membrane filtration, and membrane permeation, the monomer deposited or graft polymerized membrane or web is used in a conventional apparatus for the particular process. Thus, a graft polymerized film or membrane having desired permselective properties may be used in any of the enumerated processes depending upon the type of materials to be separated.

The following non-limiting examples are illustrative of the preparation of ion exchange and permselective materials and their utilization in accordance with this invention.

EXAMPLE 1

This example illustrates the preparation of a permselective film in accordance with the process of U.S. Pat. No. 3,083,118.

Fifteen pieces of regenerated cellulose film made by the viscose process, and containing 0.025 m. eq. of cation exchange capacity per gram of dry cellulose, about 5 mils thick in the gel state, and weighing about 1 gram were subjected individually to the following process:

The film was immersed at 25°C for one minute in a solution of 0.7 percent ferrous ammonium sulfate at pH 5.5. The film was then washed in deionized water until no test for iron in the washings could be made, and then placed in 400 ml. of 0.003 percent hydrogen peroxide in water at 100°C, the water containing 10 ml. of pure methyl methacrylate. Polymerization was continued for 5 minutes under reflux and was terminated by pouring the contents into cold water. No clouding in the aqueous solution was observed. After extraction of the film in acetone overnight and drying at 105°C for several hours, the films were found to have increased in weight by 48 percent. The films were of a slight-yellowish brown in color and were quite flexible. Mullen burst tests on the films indicated no decrease in strength as compared to control films, and were slightly over 6 pounds per mil per square inch of film area. The tenacity was about 3 grams per square mil as measured by the Scott test. Elongation at break had been decreased by about one-third as compared to a control film.

The films produced in accordance with this example comprise a graft polymer of methyl methacrylate on cellulose. The films when used in permselective processes of the type described above are substantially less permeable to larger molecules than is untreated regenerated cellulose film. Also, when these films are treated with aqueous alkali to hydrolyze the ester groups the resulting product is a graft polymerized film having a high cation exchange capacity.

EXAMPLE 2

Small sheets of manila paper were used in this experiment. They were of very closely equal weight, and contained 0.1 milli-equivalent of cation exchange capacity per gram. The papers were immersed in 0.7 percent ferrous ammonium sulfate solution at pH 5.4 for one minute, washed, and added to a solution of 0.003 percent hydrogen peroxide containing 20 ml. of pure methyl methacrylate per liter of solution. The polymerization was continued at reflux for five minutes. Polymerization was stopped as in Example 1.

The paper was dried and found to have increased in weight by 90 percent. It was a cream color, somewhat rigid, its dry Mullen strength was only about half that of the original paper, and its wet Mullen strength was about one and a half times its dry Mullen strength.

The graft polymerized paper web formed in this example is useful as a dialysis membrane and when saponified with aqueous alkali has substantial ion exchange capacity.

EXAMPLE 3

Manila paper was treated as in Example 2, except that a monomer solution of butyl acrylate instead of methyl methacrylate was used. Polymerization time was twenty minutes.

The film increased in weight by 44 percent, and was quite flexible even after having been dried at 110°C overnight. A few of the sheets exhibited some adhesiveness.

The graft polymerized paper web produced in this example is useful as a permselective membrane and after saponification with aqueous alkali is useful as a cation exchange membrane.

EXAMPLES 4 and 5

Synthesis of an amphoteric film that will contain 0.02 meq./gm. cation exchange and 0.15 meq./gm. anion exchange capacity is shown in this example. The film contains a weak base group of known nature, which is used for catalyst binding. A single component catalyst was used.

Amino groups were introduced into cellulose by steeping the film in aqueous 2-chloroethylamine hydrochloride, blotting, and placing in 50 percent sodium hydroxide solution at 100°C. for five minutes, according to the procedure of Guthrie, J. D., Textile Research J. 17, 625 (1947). The films were then washed with deionized water until neutral, and were found to contain 0.15 milliequivalent of anion exchange capacity per gram.

Persulfuric acid was made by passing ammonium persulfate through an Amberlite 1R-120 cation exchange resin in its acid form. The cellulose containing the amino groups was then steeped in the persulfuric acid for two minutes, washed to remove the uncombined catalyst, and then placed in 300 ml. of water containing 20 ml. of acrylonitrile at 50°C. for 30 minutes.

After drying, the film had increased in weight by 23 percent.

In another experiment, amino cellulose, produced as described above, was steeped in 1 percent persulfuric acid for two minutes and washed free of excess uncombined persulfate at room temperature. A solution of 400 ml. of water containing 20 ml. of pure methyl methacrylate and 0.3 gm. of sodium bisulfite was prepared and heated to 50°C. The persulfate treated film was then added and the system heated under air at 60° for fifteen minutes.

After drying, the resulting films showed an average increase in weight of 65 percent. The films produced in these examples are useful as dialysis, reverse osmosis, or other permselective membranes and are also useful as ion exchange membranes when the graft polymer is hydrolyzed with aqueous alkali.

EXAMPLE 6

Two mil thick cellulose film containing 0.06 me. of exchange capacity per gram was used. The carboxyl in the films was in the acid form, i.e. the film had been treated with acid to convert any carboxyl present as salt into the free acid. About one gram was placed in a solution of 0.025 percent ferrous ammonium sulfate at pH 4.4. Within a minute the pH had dropped to 3.6 because of ion exchange. The film was removed, blotted, and immediately dropped into a boiling solution of 400 ml. of 0.003 percent hydrogen peroxide containing 10 ml. of pure methyl methacrylate. The solution was allowed to reflux for 15 minutes.

After stoppage of polymerization, the dry film weighed 90 percent more than originally. No turbidity arose in the aqueous phase, thus indicating that there was no escape of catalyst ions.

The product of this example is a polymethyl methacrylate — cellulose graft polymer and is useful as a permselective membrane or after hydrolysis with aqueous alkali is useful as a cation exchange membrane.

EXAMPLE 7

This example shows the modification of a cellulose film by deposition of a basic polymer, the resulting polymer-modified film being capable of anion exchange as an anion exchange membrane. The example also shows a different order of steps in the method of this invention; the monomer and hydrogen peroxide are mixed in solution, and the ion-exchanged polymeric host material is then added to this solution.

N,N dimethyl aminoethyl acrylate was freed of inhibitor and the monomer acetate was made by dissolving 5 ml. of the monomer in acetone and preciptitating the acetate salt with 5 ml of glacial acetic acid. Excess of acid was removed by washing the salt with ether. The salt was then made up to about 50 percent in water.

One gm. of cellulose film containing 0.02 milliequivalent of carboxyl per gram cellulose was steeped in 0.7 percent ferrous ammonium sulfate at room temperature and pH 5.5 for one minute and washed with deionized water to remove the salt not chemically combined.

Ten ml. of the above aqueous solution of the monomer acetate were added to 100 ml. of boiling 0.03 percent hydrogen peroxide. The treated cellulose film was added and refluxing allowed to proceed for 15 minutes. The slighly yellow solution of the monomer remained clear during the polymer deposition.

After the film was removed and washed with hot water for several hours and dried overnight at 110°C, it was found to have increased in weight by 6.3 percent. The film remained flexible, and showed ability to be dyed with acid dyes. Acid dyes which can be used in this manner include sulfonic acids or sulfonic acid salts of dye compounds of the nitrophenol, azo, triphenyl methane, anthraquinone, indigoid, and similar series, but primarily azo and anthraquino dyes, e.g. Milling Yellow H5G, Brilliant Carmine L, Supranol Scarlet G, Toluylene Brown G, Fast Light Yellow G, Anthralan Yellow G, Acid Magenta, Sulfonic Acids of Phenylated Rosanilins, Rosinduline GG, and sulfonated Alizarin.

EXAMPLE 8

This example shows that a basic monomer can be made to deposit as a polymer in a controlled portion of the host material.

The procedure of Example 7 was repeated except that the cellulose films were treated only 3 seconds with the ferrous catalyst solution before being subjected to polymer deposition. A polymerization time of 1 hour was used.

The films increased in weight by 1.4 percent. Cross sections of the film dyed with an acid dye showed that the polymer deposition was mainly limited to the surface layers of the cellulose film.

EXAMPLES 9 and 10

Beta aminoethyl acrylate was polymerized into cellulose film by the procedure used in Example 7. The films increased in weight by 18 percent.

In another experiment, the celluose film was treated for only five seconds in the ferrous solution and then used for polymer deposition from Beta aminoethyl acrylate. Under these conditions, only 2.1 percent polymer was deposited.

In each of these experiments, the film containing deposited polymer could be fast dyed with acid dyes such as Orange No. 1 free acid, acid solutions of Orange 11, F.D. C Red No. 3, and common wool dyes. The amino group in the polymer was capable of acid absorption and of ion exchange after conversion to a salt. When the films were dyed, the dye was found to be localized in the region of polymer deposition.

EXAMPLES 11 and 12

These examples illustrate the use of ion exchange bound catalyst deposition of polymer acids to create cation exchange membranes of medium ion exchange capacity from cellulose film.

Cellulose film was steeped in 0.1 percent ferrous solution, as ferrous chloride, for one minute and then washed. The film was placed in 200 ml. of 0.003 percent hydrogen peroxide solution containing 10 ml. of glacial methacrylic acid. The mixture was heated at reflux for 15 minutes and then dropped into cold water to stop the reaction. The film was dried and weighed and found to have increased in weight by 9.2 percent.

When this procedure was varied by soaking the film in ferrous solution for only 5 seconds, the polymer deposited product contained only 1.4 percent polymer. The polymer deposition was localized in the surface layers of the film as shown by dying the film with basic dyes and microscopically examining cross sections.

EXAMPLE 13

Hygrostated wool was treated at room temperatures with 0.8 solution of persulfuric acid for 30 minutes and washed free of excess reagent not chemically combined, with three 10 minute washes with deionized water. The wool was added to a 400 ml. water solution containing 0.3 gram of ferrous ammonium sulfate and 5 percent acrylic acid. The wool was allowed to remain in the solution for 19 ½ hours at 25°C.

After removal, washing, and drying, the wool sample was found to have increased in weight by 13 percent and the polyacrylic acid grafted onto the wool was limited to the outer layers of the wool fibers. The polymer grafted wool fibers may be used to prepare ion exchange fabrics for carrying out separations of materials by cation exchange.

EXAMPLE 14

2.96 grams of dry cellulose wood fibers were steeped with gentle stirring for one hour in 250 parts of 1 percent aqueous solution of ferrous ammonium sulfate containing 0.01 percent sodium lauryl sulfate wetting agent. The steeping was carried out at 25°C and pH 5.3. The ferrous iron not combined with the ion exchange groups of the wood pulp fibers was washed out by two 20 minute washes with 200 parts of distilled water.

The wet wood pulp was placed in 300 parts of deareated distilled water and 15 parts of inhibitor free 4-vinyl pyridine monomer was added and shaken with the water. Air was displaced by nitrogen from the above monomer solution and enough hydrogen peroxide was added to the monomer solution to make its concentration in the solution 0.025 percent by weight. The pulp was left in the monomer solution at 25°C for 18 hours with occasional shaking. At the end of this time a slight turbidity was observed in the aqueous solution. The pulp was removed from the slurry by filtration, washed with methanol and water and dried to constant weight under vacuum at 95°C.

The wood fibers contained about 5 percent polymer addon which was deposited within the interior of the fibers. When the polymer-modified wood pulp was placed in an iron-tartarate cellulose solvent, it swelled to about 6 times the original volume but did not dissolve after two days at 5°C. The pulp containing the basic polymer could be dyed with acid dyes and could take part in anion exchange processes in its chloride form with thiosulfate, sulfate, hydroxyl, ferricyanide ions and the like.

EXAMPLE 15

This example illustrates one manner of making a paper capable of engaging in anion exchange reactions.

Vinyl pyridine has been deposited into paper by employing the method of this invention. Steeping 0.3 gram samples of Whatman No. 42 filter paper having an ion exchange capacity of 0.013 m. eq. per gram in 0.5 percent $Fe^{++}$ solution (pH 4.4), followed by refluxing in a 10 percent solution of vinyl pyridine in water containing 0.1 percent $H_2O_2$ gave an increase in weight of 1.3 percent after 15 minutes and 3.1 percent after 180 minutes.

EXAMPLE 16

This example illustrates the profound effect of a change in pH to promote more nearly complete use of the catalyst binding capacity of paper used as the starting material with the method of this invention.

The same procedure was followed as in Example 15, except that the pH of the ferrous ammonium sulfate solution was made 5.4.

An increase in weight of 3.2 percent was obtained in 15 minutes.

EXAMPLE 17

Ignited, but not acid washed, short fiber asbestos was dried and 3.830 grams were sifted into 400 ml. of 1 percent ferrous chloride solution. The solution was stirred 1 hour, filtered, and washed continuously for 1 hour with a slow stream of distilled water going into the glass filter funnel. The asbestos was added to 200 ml. of deaerated water plus 15 ml. of acrylonitrile monomer. About 3.0 ml. of 3 percent hydrogen peroxide were added to the solution and the mixture let stand under nitrogen for 18 hours at 25°C. Polymer formation had taken place so that no soluble inhibitor was present in large amounts in the asbestos.

The asbestos-polymer mixture was dried to constant weight at 70°C. under vacuum for 30 hours. The material weighed 9.084 grams.

Solvent extraction of free polymer was attempted by placing the dried asbestos-polyacrylonitrile in 250 ml. of dimethyl-formamide in a glass, stoppered bottle and shaking at one hour intervals during the day for five days. Some polymer went into solution but a thick gel remained on the flask bottom.

When 5.00 ml. of solution were removed, added to a petri dish and a film formed by the removal of the solvent under vacuum, the film weighed 0.0480 gram. Thus there were 2.40 grams of polyacrylonitrile that dissolved. Correcting the initial weight by this 6.684 grams comprised asbestos plus polymer bound in some fashion, and about 42 percent polymer was present in the asbestos.

The product of this example is a graft polymer of acrylo-nitrile on asbestos. When the graft polymerized product is hydrolyzed with aqueous alkali it can be used as a cation exchange material.

EXAMPLE 18

This example illustrates the deposition of a polymer that is capable of forming coordinate complexes with a variety of substances. The film containing this polymer may be used as a reagent paper, a semi-permeable membrane, an absorbent, etc.

Steeping the film in 0.1 percent $Fe^{++}$ solution (as ferrous ammonium sulfate) at a pH of 5.0 followed by polymerization in 1.5 percent aqueous solution of N-vinyl pyrrolidone containing 0.003 percent $H_2O_2$ gave an increase in weight of 1 percent after 15 minutes, 2.1 percent after 30 minutes, 3.2 percent after one hour and 4.6 percent after two hours.

Substituting $Ni^{++}$ for $Fe^{++}$ gave an increase in weight of 1.9 percent after 1 hour and 2.7 percent after 2 hours.

The deposited polymer is capable of complexing dyes and biologically important organic substances.

EXAMPLE 19

This example describes the use of a cellulose film containing poly-4-vinyl pyridine uniformly deposited in the interior as a weak base anion exchange membrane.

Reilly Tar and Chemical Corporation 4-vinyl pyridine was freed of inhibitor by distillation at reduced pressure under nitrogen.

Wet cellulose film about 2.3 mil thick and of known cellulose weight was steeped in 200 ml. of a solution of 1 percent hydrazine hydrate in water for 20 minutes. The cellulose weighed about 1.2 grams and had an ion exchange capacity of about 0.02 milliequivalent per gram. The cellulose was washed three times for 5 minutes each time in 200 ml. portions of distilled water at 25°C. The cellulose with bound hydrazine was dropped into 150 ml. of 3 percent 4-vinyl pyridine solution in water at 70°C. While nitrogen was passed through the solution 2.0 ml of 3 percent hydrogen peroxide was added and the solution containing the cellulose was refluxed for 1 hour.

The polymer-modified cellulose film was steeped in three batches of 200 ml. of 0.5 normal hydrochloric acid for 20 minutes each time to remove a trace of surface polymer from the polymer-modified cellulose film. When the films of poly vinyl pyridine-cellulose were dried under vacuum at 90°C. to constant weight and weighed, there was 26 percent polymer within the cellulose film.

A few anion exchanges were carried out using the weak base anion exchange membrane of cellulose-polymer. The dry film was rewet in 200 ml. of 1.0 normal hydrochloric acid and washed with distilled water to constant pH.

The film was placed in 200 ml. of 10 percent potassium nitrate solution and stirred for 10 minutes. The nitrate solution was decanted and the film was wahsed three times in 150 ml. portions of distilled water. The first washing was added to the decanted liquid for chloride analysis. About 0.9 milliequivalent of chloride had been displaced by the nitrate ion.

When the above treatment with acid was repeated and nitrate exchange took place almost the same amount (0.92) milliequivalent of chloride was released.

When the deposited polymer was in the free base form it hydrolyzed similarly to the cellulose film that contained poly-2, vinyl pyridine so that when the film was washed for the next anion exchange some of the exchange groups were occupied by hydroxyl ion.

The weak base anion exchange membrane containing both nitrate and hydroxyl groups was steeped in saturated sodium acetate solution as above and nitrate determined, it was found that about 0.8 milliequivalent of nitrate ion had been bound. This figure is less than a third of the basic nitrogen content of the membrane on the basis of the vinyl polymer content.

When the polymer-modified cellulose film was converted to the chloride form and washed only once to minimize hydrolysis and steeped in 5 percent sodium sulfate solution, washed twice and the sulfate displaced with 5 normal sodium hydroxide it was found that about 1.8 milliequivalents of sulfate had combined with the resin. The membrane could be reconverted to the chloride form and displaced with oxalate and about 1.7 millequivalents was combined.

The anion exchange membrane would combine with almost the equivalent amount of free acid when the polymer base was present as the free base. Thus cellulose with the poly-4 vinyl pyridine deposited and washed in water and immersion in acetic, hydrochloric, sulfuric, or phosphoric acid would combine with about 95 percent of the amount of acid that the nitrogen content of the membrane would correspond to.

Potassium ferricyanide colored the anion exchange resin intensely yellow.

The cellulose film containing this basic polymer could be dyed with ordinary acid dyes in relatively fast colors.

The cellulose films into which the 2-vinyl-and-4-vinyl pyridines had been deposited were insoluble in cellulose solvents tried.

Other cellulose materials such as rayon, cotton, linen, jute and the like can be modified by uniform or controlled non-uniform deposition of this basic polymer.

EXAMPLE 20

In this example, dialysis beads are prepared in accordance with the process of U.S. Pat. No. 3,083,118. Porous ceramic beads are treated with collodion and dried to produce a thin film of nitro cellulose on the exterior of the beads. The beads are then treated with aqueous sodium sulfide to denitrate the film and yield a product having a surface film of regenerated cellulose. The beads which are thus prepared are moderately useful in dialyzing relatively large dissolved molecules from colloidal suspensions. In order to make the dialysis beads more selective for removal of smaller molecules from solution the regenerated cellulose film on the beads is modified in accordance with U.S. Pat. No. 3,083,118.

The ceramic beads, coated with regenerated cellulose, are treated with ferrous ammonium sulfate, as described in Example 1, washed, and then treated with methyl methacrylate monomer and dilute hydrogen peroxide to effect a graft polymerization of methyl methacrylate in the regenerated cellulose film. The cellulose film acquires a graft polymer addon of about 50 percent when treated in this manner. The poly methyl methacrylate — cellulose graft polymer film on the dialysis beads is effective to increase the efficiency of the beads substantially in dialyzing low molecular weight molecules from solutions or colloidal dispersions containing higher molecular weight molecules. These beads are effective in removing and recovering caustic from viscose steep caustic. The senstivity of the dialysis beads for separation of different size molecules is such that, at higher poly methyl methacrylate addons, it is possible to separate chloride from sulfate anions.

EXAMPLE 21

This example illustrates the preparation of wood base ion exchange or dialysis particles. Wood chips or sawdust are treated with vinyl pyridine monomer to produce a graft polymer on the surface of the wood particles, following the procedure described in Example 14. The resulting product is useful as a substitute for dialysis beads in effecting separation of low molecular weight solute from higher molecular weight solute or colliodal particles in a solution or colliodal dispersion.

When the vinyl pyridine — wood fiber graft polymer is treated with a methanol solution of methyl sulfate the pyridine functional groups are quaternerized to produce highly alkaline quaternary ammonium (pyridinium) groups. The product thus produced is a relatively stronger anion exchanger and may be used in a variety of anion exchange separations.

EXAMPLE 22

Pellets of carbon black are treated with a dilute aqueous solution of ferrous ammonium sulfate to ion exchange ferrous ions into the acidic ion exchange groups. The treatment with ferrous solution is for a relatively short period of time, viz. a few seconds, to localize the exchange of ferrous ions into the exterior of the pellets. The ion exchange treated pellets are then placed in a solution of methyl acrylate and a small proportion of hydrogen peroxide. The methyl acrylate is polymerized and grafted to the pellets in the exterior region of the pellets where the ferrous ion was deposited by ion exchange reaction.

The methyl acrylate — carbon black graft polymerized pellets are useful as dialysis beads. Also, the methyl acrylate graft polymer may be hydrolyzed with strong alkali to produce acrylic acid functional groups which facilitate the use of the graft polymerized pellets as cation exchange materials.

EXAMPLE 23

Experiments were carried out in which polymers were deposited onto glass fibers. The glass fiber used was a type 182 sateen weave glass reinforcing cloth made specifically for reinforcement of plastics. The original glass fiber had been sized with an oil-starch emulsion as shown by iodine staining and microscopic observation. The sized glass fiber was desized in a conventional manner using detergents and with acid hydrolysis of the starch size. Microscopic observation of the glass fibers after the desizing process indicated that they were clean.

The glass fabric was cut into 1 cm. squares and placed in glass reactors for ion exchange reaction. About 20 g. of glass fiber was used for each ion exchange experiment. The glass fabric was pre-treated with pH 11 aqueous sodium hydroxide for one day prior to the experiments. The ion exchange was conducted using a copper-ammonia complex solutions were passed through columns of treated glass fabric at the rate of 10–15 ml/min. One liter of each of the solutions was passed through the glass columns and the column then washed with 500 ml. of pH 11 aqueous sodium hydroxide. The ammonia complexes were at the same pH for the exchange reaction. The copper-treated glass became slightly greenish and the silver-treated glass slightly gray as the result of this treatment. The copper and silver cations were then eluted from the glass using 0.5 N nitric acid. The eluates were then concentrated and analyzed by conventional means. Both the silver and the copper cations were found to have exchanged onto the glass in amounts corresponding to 0.0035 m. eq./g. of glass. This amount of ion exchange is quite adequate for the use of the two cations as catalysts or components of initiator systems when bound to the glass surface.

In one experiment, 3.3273 g. of sateen glass fabric was placed in 300 ml. of deaerated distilled water containing 1 ml. of 85 percent hydrazine hydrate. The pH of the mixture was 10.2. The glass was left for about three minutes in this mixture and then washed once with 200 ml. of pH 11 aqueous sodium hydroxide. The glass was then removed and placed in a mixture of 300 ml. water and 25 ml. of methyl methacrylate at approximately 100°C. Thirty seconds later, 10 ml. of 0.3 percent hydrogen peroxide was added and the solution was refluxed for about 30 minutes. The heat was shut off, and the solution and glass fabric were allowed to stand for 18 hours. The glass fabric was then removed and was found to be coated with a layer of polymer. The monomer solution was at a pH of 5. When the glass fabric was dried under vacuum at 90°C. for two hours, it was found to weigh 3.4548 g. The deposition resulted in a 3.8 percent addon of poly (methyl methacrylate).

The product produced in this example comprises a graft polymer of polymethyl methacrylate on the glass fabric. When the graft polymer is treated with aqueous alkali it is hydrolyzed to produce free methacrylic acid groups. The hydrolyzed product is useful as a cation exchange membrane or fabric.

EXAMPLE 24

A regenerated cellulose film is immersed for three seconds in a 0.7 percent solution of ferrous ammonium sulfate at a pH of 4.5 and 25°C., and then washed in deionized water to remove ion not chemically combined with the cation exchange groups of the film. The film is then immersed in 2 liters of 0.003 percent hydrogen peroxide containing 25 ml. of vinyl pyridine. The treatment is effective to produce a graft polymerization of vinyl pyridine in the outer layers of the regenerated cellulose film, the graft polymer being localized in only the regions where the ferrous ion was introduced by ion exchange. The vinyl pyridine-cellulose graft polymer is then treated with a solution of methyl sulfate in methanol to quaternerize the pyridine groups. The product thus obtained is a regenerated cellulose film having quaternerized vinyl pyridine graft polymerized therein. The quaternary pyridinium groups are relatively strong anion exchange groups and are localized in the outer layer of the film. This ion exchange film or membrane is especially useful for ion exchange recovery of large anions from solution. The anions which are separated are ones which do not diffuse readily into conventional ion exchange resins.

The proceudre described above can be used similarly for the deposition or graft polymerization of polymers into cellulose films (or other host materials) to produce cation exchange materials having the cation exchange groups located in the outer layer of the host.

EXAMPLE 25

Poly methyl methacrylate — regenerated cellulose graft polymers, produced as described in Example 1, are particularly useful in reverse osmosis processes for purification of brackish water and other impure solutions.

A regenerated cellulose film having a graft polymer addon of about 50 percent poly methyl methacrylate is used in a conventional reverse osmosis apparatus for separation of salt from brackish water. Using a feed solution containing 500 p.p.m. salt at a pressure of 170 atms. there is a water flow through the membrane of 1 to 4 gal./ft. 2/day/atm./mil. with a salt rejection of the order of about 80 – 90 percent.

EXAMPLE 26

A graft polymerized membrane is prepared using the procedure described in Example 1 but substituting ethyl acrylate for methyl methacrylate in the process. The product produced is a graft polymer of ethyl acrylate on the regenerated cellulose film. This product is particularly useful in a reverse osmosis process for separation of salt from brackish water.

A salt solution containing approximately 100,000 ppm. salt is forced through a poly ethyl acrylate — regenerated cellulose graft polymer film under a pressure of about 170 atms. Water flows through the film under these conditions with a salt rejection of the order of about 98 percent. This graft polymer film may be used in single stage or multi-stage reverse osmosis separations for purification of brackish water.

EXAMPLE 27

This example shows a general method of changing the "pore size" of an anion exchange resin substance. The resin may be shaped as bead, film, fabric, etc.

A sample of chemically pure Amberlite IRA–400 anion exchange resin (a strong base anion exchanger) was regenerated with 4 percent sodium hydroxide, then washed to neutrality with deionized water and dried to constant weight under vacuum at 80°C.

Increments of the dry anion exchange resin were weighed out and steeped for 2 minutes in 1 percent ammonium persulfate in water at 25°C. The increments were thoroughly washed on a fritted glass filter to remove the persulfate which was not chemically combined with the tetraalkyl-ammonium type strong base group in the resin structure.

Each increment of resin was placed in 100 ml. of a solution of 1 percent butylacrylate monomer at 52°C. Enough cation was then added so that the solution was 0.01 percent with respect to the cation. The solution was then held at 50°C. for thirty minutes; at the end of this time the resin was poured from the beakers to a fritted glass filter and washed with water and acetone. The resin modified by deposition of polymer was dried at 110°C. to constant weight. The salts whose cations were used as reducing agents in this reductive activation polymer deposition were as follows:

Manganous as manganous sulfate monohydrate,
Ferrous as ferrous ammonium sulfate hexahydrate,
Chromous as potassium chromium sulfate.

The average increases in weight noted for the various systems of resins plus polymer were as follows:

| Initiator System: | Increase in Weight Percent |
|---|---|
| Persulfate-ferrous ion | 18.6 |
| Persulfate-manganous ion | 17.1 |
| Persulfate-chromous ion | 16.5 |

The several examples set forth above illustrate the application of polymer deposited or graft polymerized materials in separatory processes such as ion exchange processes or permselective processes. The polymer deposited or graft polymerized materials used in such separatory processes are preferably prepared in accordance with the process of U.S. Pat. No. 3,083,118. However, other processes of polymer deposition or graft polymerization may be used so long as the resulting graft polymer has the desired properties of ion exchange or permselectivity.

The deposition or grafting of polymers in accordance with U.S. Pat. No. 3,083,118 depends upon the chemical nature of the host material rather than its physical form and the deposition may therefore be made into films, fibers, granules, papers, batts, molded structures or any formed article. The uniform deposition or controlled localized deposition can lead to the synthesis of films, membranes, webs, papers, mats, fabrics, batts, beads, and the like that have various amounts of polymers deposited into them at selected locations. Thus, the host formed structure can be modified by various amounts of polymer addon so that the space remaining for diffusion of anions or cations into the ion exchange bead, membrane or fabric is limited so that only those below a certain size will exchange. Because the process of polymer grafting or polymer deposition is selective with respect to location it is possible to manufacture novel films or fibers wherein an acid polymer is deposited at one site and a basic polymer at another site in the same host film or fiber. Alternatively, sheath deposition of two different polymers into opposite sides or a film is possible. Films produced with both anion and cation exchange sites are useful in chemical separation, synthesis, analysis, differential dyeing, etc.

As previously noted, the polymer deposition or polymer grafting process is useful in the modification of permselective materials to produce pre-selected degrees of permselectivity for effecting separations of specific materials which can not be separated using conventional permselective films or membranes. Dialysis beads, membranes, fibers and the like can be made by polymer deposition and grafting by insolublizing the surface or surfaces layers of gels of low solids content. Thus, a relatively hydrophobic polymer such as poly methyl methacrylate or poly ethylacrylate can be deposited or grafted into the surface layers of gelatin or agar gel to insolublize the surface layer while leaving a water permeable gel in the interior. Individual granules or particles which have had their surfaces insolubilized in this manner may be used as dialysis or other permselective beads. Simiarly, dialysis membranes, gas mixture resolving membranes, packaging films, and the like may be insolublized by polymer deposition or grafting so that they may be used in media in which the host material would dissolve.

The process of polymer deposition has been used in the examples set forth above for preparing ion exchange materials and materials used in a variety of permselective processes. While the example emphasize the use of polymer deposited or polymer grafted materials in processes of dialysis and reverse osmosis, it should be understood that graft polymerized materials may be used in any of the various permselective processes described above.

I claim:

1. A method of separating ions or molecules from a mixture by ion exchange, electron exchange, complex formation, dialysis, gaseous diffusion, sorption, pervaporation, water rejection, or salt rejection which comprises contacting said mixture with an ion exchange material, electron exchange material, complexing material dialyzing material, gas diffusion controlling material, sorbent, pervaporation controlling material, water rejecting material, or salt rejecting material comprising a host material having a polymer of an olefinically unsaturated monomer graft polymerized therein to provide the desired separatory properties.

2. A method as defined in claim 1 in which said host material is a particulate, molded, or formed material, or a fabric, web, or membrane.

3. A method as defined in claim 2 in which said web or membrane is paper or regenerated cellulose film.

4. A method as defined in claim 2 in which said host material has said polymer grafted only in preselected regions thereof.

5. A method as defined in claim 2 in which said host material is treated to chemically fix therein a material adapted to provide at least part of a catalyst for effecting polymerization of an olefinically unsaturated monomer, within the host material by ion exchange reaction, treating the host material and chemically fixed material in any order with said olefinically unsaturated monomer, and anything additional required to render said chemically fixed material catalytically active to polymerize said monomer and graft the resulting guest polymer within said host material.

6. A method as defined in claim 1 in which a solution of an electrolyte is contacted with an ion exchange material comprising a host polymeric material having a polymer graft polymerized therein having functional groups with substantial ion exchange capacity.

7. A method as defined in claim 6 in which the grafted polymer contains acidic or basic functional groups or mixtures thereof.

8. A method as defined in claim 6 in which said host material is treated to chemically fix therein a material adapted to provide at least part of a catalyst for effecting polymerization of an olefinically unsaturated monomer, within the host material by ion exchange reaction, treating the host material and chemically fixed material in any order with said olefinically unsaturated monomer, and anything additional required to render said chemically fixed material catalytically active to polymerize said monomer and graft the resulting guest polymer within said host material.

9. A method as defined in claim 1 in which said host material is treated to chemically fix therein a material adapted to provide at least part of a catalyst for effecting polymerization of an olefinically unsaturated monomer, within the host material by ion exchange reaction, treating the host material and chemically fixed material in any order with said olefinically unsaturated monomer, and anything additional required to render said chemically fixed material catalytically active to polymerize said monomer and graft the resulting guest polymer within said host material.

10. A method as defined in claim 1 in which a solution or fluid mixture containing ions or molecules of different size, shape, or polarity, is contacted with a material comprising a host material having a polymer of an olefinically unsaturated monomer graft polymerized therein to provide the desired separatory properties, whereby only selected molecules or ions pass therethrough.

11. A method as defined in claim 10 in which said host material is treated to chemically fix therein a material adapted to provide at least part of a catalyst for effecting polymerization of an olefinically unsaturated monomer, within the host material by ion exchange reaction, treating the host material and chemically fixed material in any order with said olefinically unsaturated monomer, and anything additional required to render said chemically fixed material catalytically active to polymerize said monomer and graft the resulting guest polymer within said host material.

12. A method as defined in claim 10 in which said host material is a particulate, molded, or formed material, or a fabric, web, or membrane.

13. A method as defined in claim 12 in which said host material is treated to chemically fix therein a material adapted to provide at least part of a catalyst for effecting polymerization of an olefinically unsaturated monomer, within the host material by ion exchange reaction, treating the host material and chemically fixed material in any order with said olefinically unsaturated monomer, and anything additional required to render said chemically fixed material catalytically active to polymerize said monomer and graft the resulting guest polymer within said host material.

* * * * *

UNITED STATES PATENT OFFICE
CERTIFICATE OF CORRECTION

Patent No. 3,723,306            Dated  March 27, 1973

Inventor(s)  Douglas J. Bridgeford

It is certified that error appears in the above-identified patent and that said Letters Patent are hereby corrected as shown below:

Column 8, line 43, after "0.8" insert -- percent --.

Column 14, line 23, "proceudre" should read -- procedure --.

Signed and sealed this 3rd day of June 1975.

(SEAL)
Attest:

RUTH C. MASON
Attesting Officer

C. MARSHALL DANN
Commissioner of Patents
and Trademarks